US012748321B2

(12) United States Patent
Matsuoka

(10) Patent No.: US 12,748,321 B2
(45) Date of Patent: *Sep. 29, 2026

(54) METHOD FOR DESIGNING SPECTACLE LENS, METHOD FOR MANUFACTURING SPECTACLE LENS, AND SYSTEM FOR DESIGNING SPECTACLE LENS

(71) Applicant: HOYA LENS THAILAND LTD., Pathumthani (TH)

(72) Inventor: Shohei Matsuoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 1103 days.

This patent is subject to a terminal disclaimer.

(21) Appl. No.: 17/586,250

(22) Filed: Jan. 27, 2022

(65) Prior Publication Data

US 2022/0236590 A1 Jul. 28, 2022

(30) Foreign Application Priority Data

Jan. 27, 2021 (JP) ................................ 2021-010739

(51) Int. Cl.
*G02C 7/02* (2006.01)

(52) U.S. Cl.
CPC .................................... *G02C 7/024* (2013.01)

(58) Field of Classification Search
CPC .......... G02C 7/02; G02C 7/021; G02C 7/022; G02C 7/025; G02C 7/027; G02C 7/028
See application file for complete search history.

(56) References Cited

U.S. PATENT DOCUMENTS

2002/0196412 A1* 12/2002 Abitbol .................... G02C 7/02 351/219
2005/0088616 A1 4/2005 Nason et al.
(Continued)

FOREIGN PATENT DOCUMENTS

EP 1 262 815 A2 12/2002
JP 5096662 B2 12/2012
WO 2006/116820 A1 11/2006

OTHER PUBLICATIONS

Schuldt, "Ysis-Natürliches Sechen Erleben" Deutsche Optiker Zeitung, Germany, No. 5/2004, May 1, 2004, pp. 38-43. XP002398937.
(Continued)

*Primary Examiner* — Sharrief I Broome
*Assistant Examiner* — Journey F Sumlar
(74) *Attorney, Agent, or Firm* — Oliff PLC

(57) ABSTRACT

Provided is a technology that makes a change in the amount of aberration that is a combination of aberration in an eye and aberration in a spectacle lens robust with respect to rotation. Provided are a method for designing a spectacle lens and related technologies in which, when rotational asymmetry of an aberration distribution of an eye of a wearer about an optical axis is strong, a spectacle lens that has an aberration distribution of which rotational asymmetry is weak in a region having a predetermined width and a center at any point on a main meridian of the spectacle lens is obtained as a design solution, and when rotational asymmetry of the aberration distribution of the eye of the wearer about the optical axis is weak, a spectacle lens of which rotational asymmetry is strong in the region is obtained as a design solution.

16 Claims, 10 Drawing Sheets

(56) References Cited

U.S. PATENT DOCUMENTS

| | | | | |
|---|---|---|---|---|
| 2005/0259222 | A1 | 11/2005 | Kelch et al. | |
| 2009/0279050 | A1* | 11/2009 | Mcginn | G02F 1/134309 351/204 |
| 2018/0210228 | A1* | 7/2018 | Trumm | G06F 30/00 |
| 2020/0249499 | A1* | 8/2020 | Ito | G02C 7/028 |

OTHER PUBLICATIONS

Jun. 24, 2022, Extended Search Report issued in European Patent Application No. 22152316.0.

* cited by examiner

Wearer A

Lens 1

Lens 1

Lens 1

Lens 1

Lens 2

Lens 2

Lens 2

Lens 2

Lens 3

Lens 3

FIG. 5C Lens 3
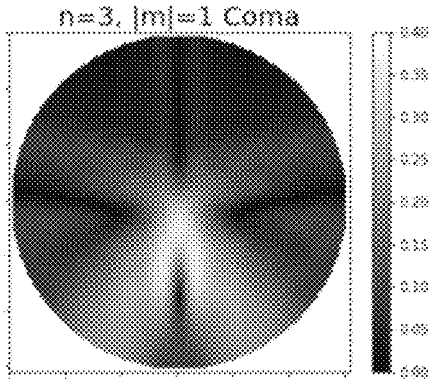
FIG. 5D Lens 3
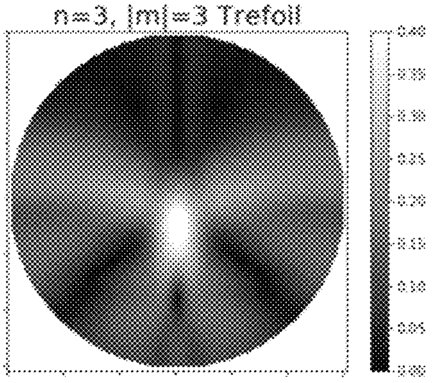

METHOD FOR DESIGNING SPECTACLE LENS, METHOD FOR MANUFACTURING SPECTACLE LENS, AND SYSTEM FOR DESIGNING SPECTACLE LENS

BACKGROUND OF THE INVENTION

1. Field of the Invention

The present invention relates to a method for designing a spectacle lens, a method for manufacturing a spectacle lens, and a system for designing a spectacle lens.

2. Description of Related Art

A method for manufacturing a lens that compensates aberrations of an eye of an ametropic person is known (JP 5096662B2). JP 5096662B2 describes correcting at least one higher order aberration in at least one direction of view.

JP 5096662B2 is an example of related art.

SUMMARY OF THE INVENTION

Even if aberrations of an eye of a wearer are compensated with a technology described in JP 5096662B2, which is a conventional technology, the compensation does not always work effectively because the wearer usually turns the eye about an optical axis and turning of the eye also occurs as a reflex movement that compensates turning of the head.

Also, when horizontal positions of left and right ears differ from each other, for example, a spectacle lens itself rotates about the optical axis and distortion occurs. In these cases, it cannot be assured that an optimized field of view will be achieved with the technology described in JP 5096662B2.

FIG. 1A is a schematic diagram of an aberration distribution showing an ideal state in which maldistribution of aberration based on a wavefront of an eye and maldistribution of aberration based on a wavefront of a spectacle lens are suppressed as a result of the wavefront of the spectacle lens being determined based on the wavefront of the eye, and the wavefronts counteracting each other.

FIG. 1B is a schematic diagram of an aberration distribution showing a state in which maldistribution of aberration based on a wavefront of an eye and maldistribution of aberration based on a wavefront of a spectacle lens are remarkable because the wavefront of the spectacle lens was determined based on the wavefront of the eye, but the eye turned about an optical axis.

In FIGS. 1A and 1B, white portions are portions in which a wavefront proceeds fast (light proceeds fast), and black portions are portions in which a wavefront proceeds slowly (light proceeds slowly). Portions in which a wavefront proceeds neither fast nor slow are shown as gray portions. The same also applies to FIGS. 2 and 6, which will be described later.

As shown in FIG. 1A, an optimized field of view can be achieved when turning of the eye and rotation of the spectacle lens about the optical axis are not considered. On the other hand, actually, the eye usually turns about the optical axis.

In the present specification, aberration can be considered as being disturbance of a wavefront of light from an eye or a lens. When waves of which aberrations have opposite signs are combined, the aberrations are offset due to characteristics of waves. When waves of which aberrations do not have opposite signs are combined, the aberrations may be offset or may not be offset. FIG. 1B shows a state in which aberrations cannot be offset because the eye turned about the optical axis. In FIG. 1B, maldistribution of aberrations based on respective wavefronts is remarkable. The present invention was made focusing on this point.

In the following description, turning of an eye about an optical axis and rotation of a spectacle lens will also be collectively referred to simply as "rotation". "Turning" will be used separately for the case of the eye (and/or turning of the head).

The present invention has an object of providing a technology that makes a change in the amount of aberration that is a combination of aberration in an eye and aberration in a spectacle lens robust, with respect to rotation. In the present specification, "robust" means that even when the rotation occurs, when aberration in the eye and aberration in the spectacle lens are combined, the amount of aberration is less likely to change when compared to conventional cases.

The inventor of the present invention carried out intensive studies on the issues described above, and considered the following logic.

For example, assume that the spectacle lens has a rotationally symmetrical aberration distribution. In this case, even if the eye turns, the amount of aberration does not change when aberration in the eye of the wearer and aberration in the spectacle lens are combined, irrespective of whether rotationally asymmetrical aberration occurs or does not occur in the eye. This also applies to a case where the eye of the wearer has a rotationally symmetrical aberration distribution.

Based on the above logic, the inventor found that, if either the eye or the spectacle lens (for example, the eye) has an aberration distribution that is rotationally symmetrical or approximately rotationally symmetrical, even when the above-described rotation occurs, a change in the amount of aberration is small (i.e., robust) when aberration in the eye and aberration in the spectacle lens are combined, even if the other of the eye and the spectacle lens (for example, the spectacle lens) has an aberration distribution that is far from being rotationally symmetrical. Hereinafter, an aberration distribution that is far from being rotationally symmetrical will also be described as being "rotationally asymmetrical". In the present specification, a case where a distribution is very far from being rotationally symmetrical will be described as "rotational asymmetry is strong", and the opposite case, i.e., a case where a distribution is close to being rotationally symmetrical will be described as "rotational asymmetry is weak".

That is, the inventor of the present invention conceived a technology that reduces a change in the amount of aberration that is a combination of aberration in the eye and aberration in the spectacle lens even when the above-described rotation occurs, by accepting and considering a wavefront of the eye, rather than determining a wavefront of the spectacle lens such that maldistribution of aberration based on the wavefront of the eye is suppressed as in the conventional technology.

The following describes aspects of the present invention that was made based on the above finding.

A first aspect of the present invention is a method for designing a spectacle lens, including:

when rotational asymmetry of an aberration distribution of an eye of a wearer about an optical axis is strong, obtaining, as a design solution, a spectacle lens that has an aberration distribution of which rotational asymmetry is weak in a region having a predetermined width and a center at any point on a main meridian of the spectacle lens; and when rotational asymmetry of the aberration distribution of the eye of the wearer about the optical axis is weak, obtaining, as a design solution, a spectacle lens of which rotational asymmetry is strong in the region.

A second aspect of the present invention is the method for designing a spectacle lens according to the first aspect, wherein when an index that is obtained by quantifying rotational asymmetry regarding the aberration distribution of the eye is represented by Ei, a standard value of Ei is represented by Es, and an index that is obtained by quantifying rotational asymmetry of an aberration distribution of a spectacle lens is represented by Li, a spectacle lens of which Li is low is obtained as a design solution when Ei is larger than Es, and a spectacle lens of which Li is high is obtained as a design solution when Ei is not larger than Es.

A third aspect of the present invention is the method for designing a spectacle lens according to the second aspect, wherein obtaining the spectacle lens as a design solution includes selecting a design solution from a plurality of design solutions that have different values of Li.

A fourth aspect of the present invention is the method for designing a spectacle lens according to the second or the third aspect, wherein Ei represents an index that is obtained by quantifying at least rotational asymmetry of an aberration distribution of a portion of a cornea corresponding to a pupil of the eye of the wearer, about the optical axis.

A fifth aspect of the present invention is the method for designing a spectacle lens according to the fourth aspect, wherein Ei is an index expressed by the following Expression 1, and $$\sum_{m,n} mE_{m,n} \qquad \text{Expression 1}$$

Li is an index expressed by the following Expression 2, $$\sum_{m,n} mL_{m,n} \qquad \text{Expression 2}$$

wherein E and L respectively represent polar coordinate expressions of Zernike aberration coefficients of the eye of the wearer and the spectacle lens, m represents a value indicating an order in a circumferential direction, and n represents a value indicating an order in a radial direction.

A sixth aspect of the present invention is the method for designing a spectacle lens according to the second or the third aspect, wherein Ei is an index determined based on at least one of a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

A seventh aspect of the present invention is the method for designing a spectacle lens according to any one of the second to sixth aspects, wherein Es is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

An eighth aspect of the present invention is the method for designing a spectacle lens according to any one of the second to seventh aspects, wherein a spectacle lens is obtained as a design solution according to a difference between Ei and Es.

A ninth aspect of the present invention is the method for designing a spectacle lens according to any one of the first to eighth aspects, wherein the spectacle lens is a progressive refractive power lens.

A tenth aspect of the present invention is a method for manufacturing a spectacle lens that is designed using the method for designing a spectacle lens according to any one of the first to ninth aspects.

An eleventh aspect of the present invention is a system for designing a spectacle lens, including:

a design unit configured to:

obtain, as a design solution, a spectacle lens that has an aberration distribution of which rotational asymmetry is weak in a region having a predetermined width and a center at any point on a main meridian of the spectacle lens, when rotational asymmetry of an aberration distribution of an eye of a wearer about an optical axis is strong; and obtain, as a design solution, a spectacle lens of which rotational asymmetry is strong in the region, when rotational asymmetry of the aberration distribution of the eye of the wearer about the optical axis is weak.

A twelfth aspect of the present invention is the system for designing a spectacle lens according to the eleventh aspect, wherein when an index that is obtained by quantifying rotational asymmetry regarding the aberration distribution of the eye is represented by Ei, a standard value of Ei is represented by Es, and an index that is obtained by quantifying rotational asymmetry of an aberration distribution of a spectacle lens is represented by Li, the design unit obtains a spectacle lens of which Li is low as a design solution when Ei is larger than Es, and obtains a spectacle lens of which Li is high as a design solution when Ei is not larger than Es.

A 13th aspect of the present invention is the system for designing a spectacle lens according to the twelfth aspect, wherein obtaining the spectacle lens as a design solution includes selecting a design solution from a plurality of design solutions that have different values of Li.

A 14th aspect of the present invention is the system for designing a spectacle lens according to the twelfth or the 13th aspect, wherein Ei represents an index that is obtained by quantifying at least rotational asymmetry of an aberration distribution of a portion of a cornea corresponding to a pupil of the eye of the wearer, about the optical axis.

A 15th aspect of the present invention is the system for designing a spectacle lens according to the 14th aspect, wherein Ei is an index expressed by the following Expression 1, and $$\sum_{m,n} mE_{m,n} \quad \text{Expression 1}$$

Li is an index expressed by the following Expression 2, $$\sum_{m,n} mL_{m,n} \quad \text{Expression 2}$$

wherein E and L respectively represent polar coordinate expressions of Zernike aberration coefficients of the eye of the wearer and the spectacle lens, m represents a value indicating an order in a circumferential direction, and n represents a value indicating an order in a radial direction.

A 16th aspect of the present invention is the system for designing a spectacle lens according to the twelfth or the 13th aspect, wherein Ei is an index determined based on at least one of a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

A 17th aspect of the present invention is the system for designing a spectacle lens according to any one of the twelfth to 16th aspects, wherein Es is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

An 18th aspect of the present invention is the system for designing a spectacle lens according to any one of the twelfth to 17th aspects, wherein a spectacle lens is obtained as a design solution according to a difference between Ei and Es.

A 19th aspect of the present invention is the system for designing a spectacle lens according to any one of the eleventh to 18th aspects, wherein the spectacle lens is a progressive refractive power lens.

The following describes other aspects of the present invention that can be combined with the aspects described above.

When determining Ei, an amount of aberration for which 1 can be ignored because the aberration is merely caused by a prism and unrelated to resolution.

An amount of aberration, for which $|m|=2$ and $n=2$, is an astigmatism amount and can be ignored when determining Ei, because the aberration is corrected even in a fixed focal lens and a user has got used to the aberration.

An aspect of the present invention may be applied to a progressive refractive power lens in which transmission astigmatism is added to an intermediate region and a near-vision region, rather than a far-vision region. The aspect of the present invention may be adopted to determine the degree of transmission astigmatism to be added.

According to the present invention, when aberration in an eye and aberration in a spectacle lens are combined, a change in the amount of aberration is robust with respect to rotation.

BRIEF DESCRIPTION OF THE DRAWINGS

FIG. 5C is a diagram showing a coma aberration distribution ($|m|=1$, $n=3$) of the lens 3. FIG. 5B is a diagram showing a Trefoil aberration distribution ($|m|=3$, $n=3$) of the lens 3.

DETAILED DESCRIPTION OF THE INVENTION

Figure 1A:
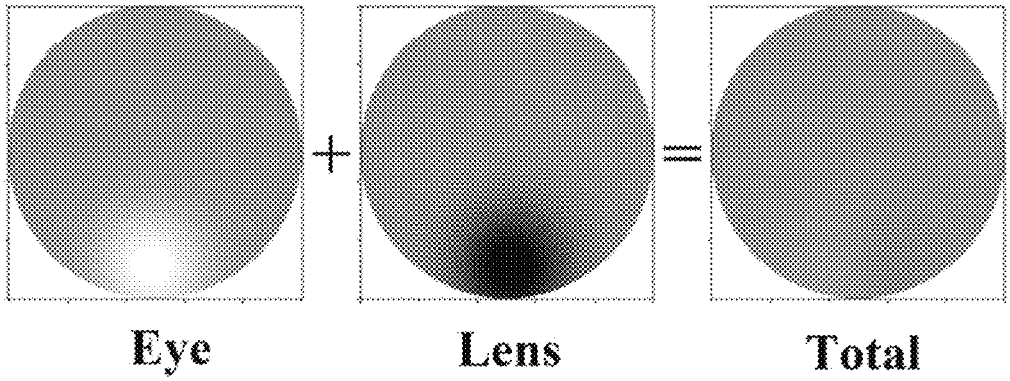
FIG. 1A is a schematic diagram of an aberration distribution showing an ideal state in which maldistribution of aberration based on a wavefront of an eye and maldistribution of aberration based on a wavefront of a spectacle lens are suppressed as a result of the wavefront of the spectacle lens being determined based on the wavefront of the eye.
Figure 1B:
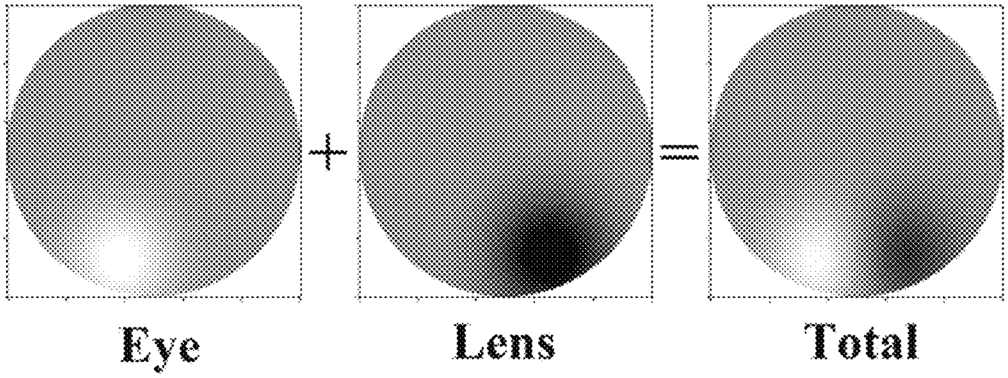
FIG. 1B is a schematic diagram of an aberration distribution showing a state in which maldistribution of aberration based on a wavefront of an eye and maldistribution of aberration based on a wavefront of a spectacle lens are remarkable because the wavefront of the spectacle lens was determined based on the wavefront of the eye, but the eye turned about an optical axis.

The following describes an aspect of the present invention. In the present specification, "to" between values means "at least a predetermined value and not larger than a predetermined value".

Method for Designing Spectacle Lens

The following is a method for designing a spectacle lens according to an aspect of the present invention.

A method for designing a spectacle lens, including:

when rotational asymmetry of an aberration distribution of an eye of a wearer about an optical axis is strong, obtaining, as a design solution, a spectacle lens that has an aberration distribution of which rotational asymmetry is weak in a region having a predetermined width and a center at any point on a main meridian of the spectacle lens; and when rotational asymmetry of the aberration distribution of the eye of the wearer about the optical axis is weak, obtaining, as a design solution, a spectacle lens of which rotational asymmetry is strong in the region.

An "optical axis" referred to in the present specification corresponds to the normal line at the center of each optical surface.

The "center" described in the above paragraph will also be referred to as a "lens center". The "lens center" means a geometric center, an optical center, or an alignment center of the spectacle lens. In the present specification, the alignment center will be described as an example.

In the present specification, a case where a line of sight passes through the lens center when the wearer views straight forward will be described as an example.

As described above, even when the above-described rotation occurs, if the above configuration is obtained, a change in the amount of aberration is small (i.e., robust) when aberration in the eye and aberration in the spectacle lens are combined. There is no particular limitation on the type of aberration for which a change in the amount is reduced, but the present disclosure is intended to be applied preferably to a higher order aberration, i.e., a three or higher order aberration.

The "predetermined width" of the region described above is a horizontal width that is smaller than the radius of the lens, and is preferably about 10 mm (for example), and more preferably a width corresponding to a pupil diameter projected to the lens surface. This may be a length on the lens surface corresponding to a pupil diameter of 2 mm (maximum diameter: 5 mm).

"Any point" described above refers to every (suitable) point on the main meridian.

The following describes preferable examples and variations of the method for designing a spectacle lens according to an aspect of the present invention.

It is preferable to quantify rotational asymmetry of an aberration distribution of the eye of the wearer about the optical axis and rotational asymmetry of an aberration distribution of the spectacle lens. The following describes an example including a quantification process.

Assume that E and L respectively represent polar coordinate expressions of Zernike aberration coefficients of the eye of the wearer and the spectacle lens, m represents a value indicating an order in a circumferential direction, and n represents a value indicating an order in a radial direction. θ represents a turning angle of the eye of the wearer about the optical axis, and γ represents a rotation angle of the spectacle lens about the optical axis. At this time, a sum of squares of aberration in the eye and aberration in the spectacle lens is expressed by the following Expression 3.

$$\begin{aligned}\mathrm{RMS}^2_{total} &= \sum_{m,n} (E_{m,n}\cos(m\theta_{m,n}) + L_{m,n}\cos(m\gamma_{m,n}))^2 + (E_{m,n}\sin(m\theta_{m,n}) + L_{m,n}\sin(m\gamma_{m,n}))^2 \\ &= \sum_{m,n} (E^2_{m,n} + L^2_{m,n} + 2E_{m,n}L_{m,n}\cos(m(\gamma_{m,n} - \theta_{m,n})))\end{aligned} \quad \text{Expression 3}$$

The sum of squares is adopted because, due to orthogonality of the Zernike polynomials, they correspond to a sum of squares of all aberrations and correspond to a spot intensity of a spot formed on a retina. In the present specification, a "spot" is a range from a peak to the first dark ring in a distribution of light generated on the retina by light that is emitted from an object point and passed through a portion of the spectacle lens and an ocular optical system. Also, in the present specification, a total energy in this range will be referred to as a "spot intensity".

The following Expression 4 is obtained by partially differentiating the above Expression 3 in terms of each turning angle. The following Expression 4 expresses fluctuation of the sum of squares of aberration in the eye and aberration in the spectacle lens due to turning.

$$dRMS^2_{total} = \sum_{m,n} 2mE_{m,n}L_{m,n}\sin(m(\gamma_{m,n} - \theta_{m,n})(d\gamma_{m,n} - d\theta_{m,n}) \quad \text{Expression 4}$$

It should be best to design a spectacle lens so as to minimize the fluctuation of the sum of squares expressed by the above Expression 4. On the other hand, it cannot be said to be advantageous to perform calculation of the above expression for each wearer, from the standpoint of calculation time and resources. In the first place, as a matter of course, the direction of a line of sight (eyeball direction) at the time when measurement is performed for a wearer to obtain parameters described above differs from the direction of a line of sight when the wearer wears the spectacle lens in daily life. This diminishes the meaning of minimizing the fluctuation of the sum of squares expressed by the above Expression 4.

Therefore, a parameter relating to the eye and a parameter relating to the spectacle lens are extracted from the above Expression 4. Then, the parameter relating to the eye in Expression 4 is taken to be an index Ei of rotational asymmetry of an aberration distribution of the eye of the wearer about the optical axis. The parameter relating to the spectacle lens in Expression 4 is taken to be an index Li of rotational asymmetry of an aberration distribution of the spectacle lens.

Ei is an index expressed by the following Expression 1.

$$\sum_{m,n} mE_{m,n} \quad \text{Expression 1}$$

Li is an index expressed by the following Expression 2.

$$\sum_{m,n} mL_{m,n} \quad \text{Expression 2}$$

The following describes a specific example of a customer, who is a subject (who is to be a wearer).

An index obtained by quantifying rotational asymmetry of an aberration distribution about the optical axis in a portion of the cornea corresponding to the pupil of an eye of a wearer A was used as the index Ei of rotational asymmetry of the eye of the wearer A. The "portion of the cornea corresponding to the pupil" refers to a portion of the cornea in a range having a diameter of at least 2 mm (maximum diameter: 5 mm) with respect to a pupil center.

A wavefront and aberration in the eye (cornea) can be acquired using methods described in conventional technologies or a known method.

A wavefront and aberration in the spectacle lens can also be acquired using methods described in conventional technologies or a known method. Specifically, for example, interference fringes of light that passed through the spectacle lens from an object side surface of the lens to an eye side surface of the lens can be measured using FUJINON F601, which is a compact laser interferometer manufactured by FUJIFILM Corporation and in which a Fizeau interferometric method is used. After obtaining a measurement result of the interference fringes, data that specifies a wavefront of light that passed through each point on the spectacle lens can be calculated by applying a known fringe analysis algorithm to the measurement result of the interference fringes. A collection of data specifying wavefronts at respective points corresponds to wavefront data of light that passed through the spectacle lens. Accordingly, the wavefront data can be obtained by plotting the data specifying wavefronts at respective points, with respect to the points.

Figure 2:
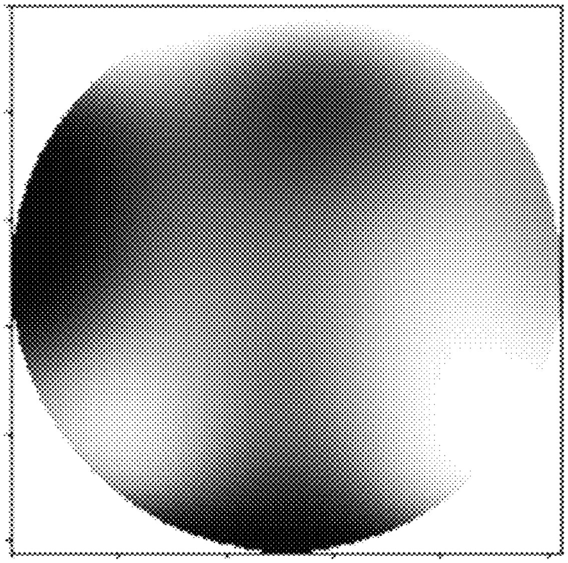
FIG. 2 is a diagram showing an aberration distribution of a portion of the cornea corresponding to the pupil of an eye of a wearer A around an optical axis.

FIG. 2 is a diagram showing the aberration distribution of the portion of the cornea corresponding to the pupil of the eye of the wearer A around the optical axis. It should be noted that the dimensions are 4 mm×4 mm.

Aberration amounts of the eye of the wearer A are as follows (unit is D (diopter), which will be omitted in the following).

m=2, n=2: astigmatism amount 0.65
m=1, n=3: coma aberration amount 0.07
m=3, n=3: Trefoil aberration amount 0.12
m=2, n=4: higher order astigmatism amount 0.06
m=4, n=4: Tetrafoil aberration amount 0.10

As for orders higher than the above orders, aberration amounts were extremely small (<0.001) and therefore are omitted. In the following, the same applies to amounts of aberrations of orders that are not described (in this example, n≥5).

When determining Ei, an amount of aberration for which n=1 can be ignored because the aberration is merely caused by a prism and unrelated to resolution.

When determining Ei, the amount of aberration, for which m=2 and n=2, is an astigmatism correction component. Unless it is the first time the wearer A has worn a spectacle lens, a previous spectacle lens should have already had the astigmatism correction component. That is, it is expected that the wearer A has got used to the astigmatism correction component. Therefore, it is thought that even if there is a change with respect to the above-described rotation in the amount of aberration relating to the astigmatism correction component when aberration in the eye and aberration in the spectacle lens are combined, the wearer A is unlikely to feel the change. Therefore, the amount of aberration, for which m=2 and n=2, may be ignored when determining Ei. The following describes such an example.

Ei of the wearer A is as follows.

$$\begin{aligned} Ei &= 1\times 0.07 + 3\times 0.12 + 2\times 0.06 + 4\times 0.10 \\ &= 0.95 \end{aligned}$$

A standard value of Ei is represented by Es. In this example, an average value of Ei of customers of the applicant was adopted as Es. This is an example, and Es is not limited to the average value, and it is also possible to adopt an average value or the most frequent value of wearers collected in big data using Internet lines, for example.

Standard values are as follows (unit is omitted).

m=2, n=2: astigmatism amount 0.44
m=1, n=3: coma aberration amount 0.18
m=3, n=3: Trefoil aberration amount 0.13
m=2, n=4: higher order astigmatism amount 0.05
m=4, n=4: Tetrafoil aberration amount 0.06

$$\begin{aligned} Es &= 1\times 0.18 + 3\times 0.13 + 2\times 0.05 + 4\times 0.06 \\ &= 0.89 \end{aligned}$$

Ei of the wearer A is larger than the standard value Es. That is, rotational asymmetry of the aberration distribution of the portion of the cornea corresponding to the pupil of the wearer A is stronger than the average. According to the method for designing a spectacle lens of the present invention, effects of the present invention are achieved by obtaining a spectacle lens of which Li is low, as a design solution for the wearer A. If Ei is not larger than Es, a spectacle lens of which Li is high is obtained as a design solution.

In an aspect of the present invention, "Li is high" when Ei>Es means that Li is higher than the value of Li when Ei≤Es. That is, "Li is high" and "Li is low" may respectively mean that "higher than the value in the other case" and "lower than the value in the other case". On the other hand, it is also possible to set a standard value Ls of Li similarly to the standard value Es of Ei, and evaluate whether Li is higher or lower than Ls.

Ls may be an average value of Li of customers of the applicant, or an average value or the most frequent value of wearers collected in big data using Internet lines, for example. It is also possible to adopt a design solution of a spectacle lens included in a predetermined product lineup of spectacle lenses, the design solution having the median value of a plurality of values of Li in the lineup.

In the aspect of the present invention, cases are separated according to which of Ei>Es and Ei≤Es applies to each case, but it is also possible to separate cases according to which of Ei≥Es and Ei<Es applies. In this case, a value that is a little smaller than the value of Es may be set as a new Es. In any case, Es is used as the threshold value for separating cases.

"Designing a spectacle lens" as used herein may mean designing an aberration distribution (and a refractive power distribution, which will be omitted hereinafter) of the spectacle lens or correcting an existing aberration distribution, based on the above result (Ei>Es). On the other hand, "designing a spectacle lens" also encompasses a case where a plurality of basic designs (design solutions) of the aberration distribution are prepared, and a design solution is selected from the plurality of basic designs that have different values of Li. In this case, the amount of calculation can be reduced and the cost and time required for designing can be saved.

In the case of a spectacle lens of which Li is low, for example, "obtaining, as a design solution" includes designing the aberration distribution described above, correcting an existing aberration distribution, and selecting a design solution from a plurality of basic designs that have different values of Li. It is also possible to output content of the designed aberration distribution, the corrected aberration distribution, or the selected design solution, as data. This can be said as "outputting data of a spectacle lens of which Li is low, as a design solution", for example.

The above-described configuration of "selecting a spectacle lens" was made based on an idea that is exactly opposite to an idea of conventional technologies. Specifically, conventional technologies focus on the best performance under predetermined envisaged conditions for an eye, but the present invention focuses on the lowest performance under conditions that are not envisaged.

In the present specification, the term "basic design" refers to an aberration distribution before an inset amount in a progressive refractive power lens is considered. That is, when the lens center of the spectacle lens is taken to be the origin, the Y axis corresponds to the main meridian. At this time, the X axis corresponds to the horizontal direction, and the Z axis corresponds to the optical axis direction (forward). Three basic designs that have different values of Li will be described later, and aberration amounts listed for each of the basic designs are aberration amounts in a region having a predetermined width and a center at any point on the main meridian of the spectacle lens. However, aberration amounts of the eye are not added to the aberration amounts listed for the basic designs. As for the above-described region, a width of 10 mm is described above as an example, but the present invention is not limited to this case.

On the other hand, the present invention is not limited to the aspect in which basic designs are aberration distributions before an inset amount is considered, and it is also possible to prepare a plurality of design solutions after setting the main meridian by taking the inset amount into consideration in advance.

Also, the spectacle lens to be designed in the present invention is not limited to a progressive refractive power lens that includes a near-vision region for seeing a near distance, a far-vision region for seeing a distance farther than the near distance, and an intermediate region that connects the near-vision region and the far-vision region and in which the power changes progressively. For example, the spectacle lens may be a spectacle lens (progressive refractive power lens) in which only a near-vision region for seeing a near distance is set and the power changes progressively in the other region of the lens, a bifocal lens, or a fixed focal lens.

In the case of a fixed focal lens, the main meridian is a straight line (e.g., the Y axis) that extends in the vertical (length) direction and passes through an axis of rotational symmetry.

In the case of a progressive refractive power lens (progressive multifocal lens), the main meridian that is set by taking an inset amount into consideration is also called a main gaze line. The main gaze line may be a straight line or a curved line, and is only required to pass through a fitting point FP, a far-vision power measurement reference point F, and a near-vision power measurement reference point N. These positions can be determined based on hidden marks provided on the spectacle lens.

The example in which a design solution is selected from a plurality of basic designs having different values of Li was adopted, and three basic designs were prepared as described below.

Figure 3A:
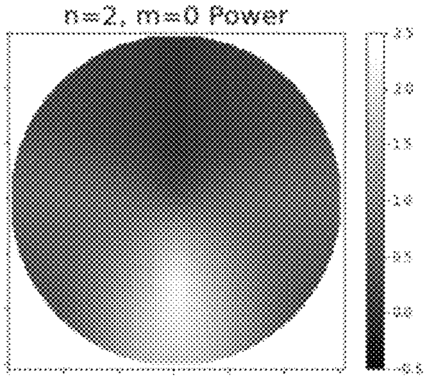
FIG. 3A is a diagram showing a refractive power distribution ($m=0$, $n=2$) of a lens 1.

FIG. 3A is a diagram showing a refractive power distribution (m=0, n=2) of a lens 1.

Figure 3B:
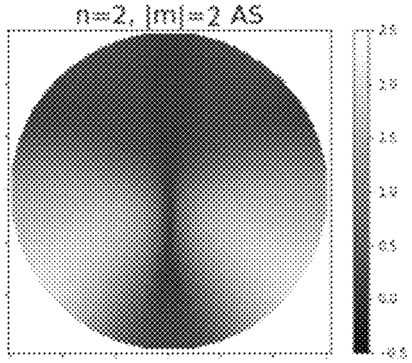
FIG. 3B is a diagram showing an astigmatism distribution ($|m|=2$, $n=2$) of the lens 1.

FIG. 3B is a diagram showing an astigmatism distribution (|m|=2, n=2) of the lens 1.

Figure 3C:
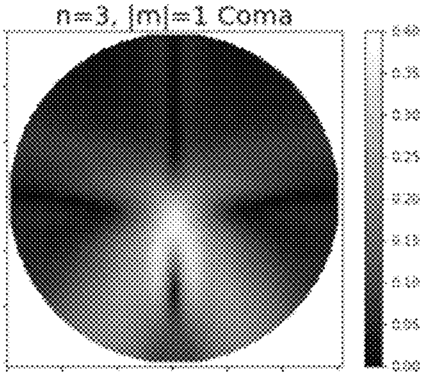
FIG. 3C is a diagram showing a coma aberration distribution ($|m|=1$, $n=3$) of the lens 1.

FIG. 3C is a diagram showing a coma aberration distribution (|m|=1, n=3) of the lens 1.

Figure 3D:
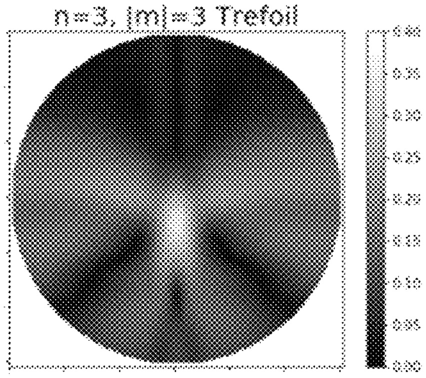
FIG. 3D is a diagram showing a Trefoil aberration distribution ($|m|=3$, $n=3$) of the lens 1.

FIG. 3D is a diagram showing a Trefoil aberration distribution (|m|=3, n=3) of the lens 1.

It should be noted that the dimensions are 50 mm×50 mm.

In FIGS. 3A to 5D, white portions are high aberration portions and black portions are low aberration portions. The same applies hereinafter to diagrams showing aberration distributions.

Aberration amounts of the lens 1 are as follows (unit is omitted).

m=2, n=2: astigmatism amount 0.03 m=1, n=1: coma aberration amount 0.35 m=3, n=3: Trefoil aberration amount 0.32

$$\begin{aligned} Li &= 2\times 0.03 + 1\times 0.35 + 3\times 0.32 \\ &= 1.37 \end{aligned}$$

Figure 4A:
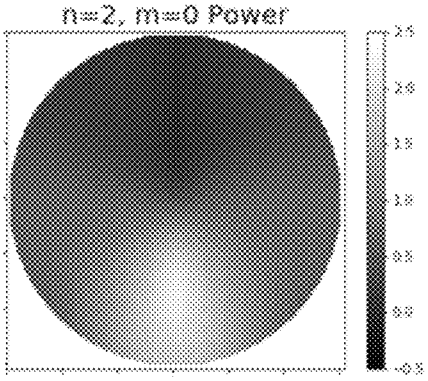
FIG. 4A is a diagram showing a refractive power distribution ($m=0$, $n=2$) of a lens 2.

FIG. 4A is a diagram showing a refractive power distribution (m=0, n=2) of a lens 2.

Figure 4B:
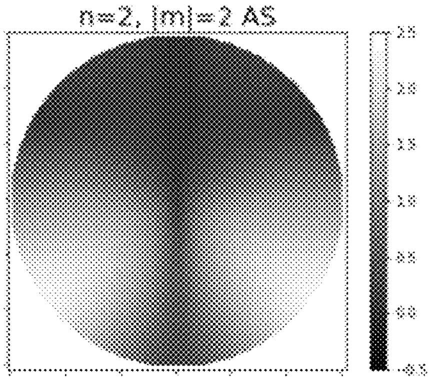
FIG. 4B is a diagram showing an astigmatism distribution ($|m|=2$, $n=2$) of the lens 2.

FIG. 4B is a diagram showing an astigmatism distribution (|m|=2, n=2) of the lens 2.

Figure 4C:
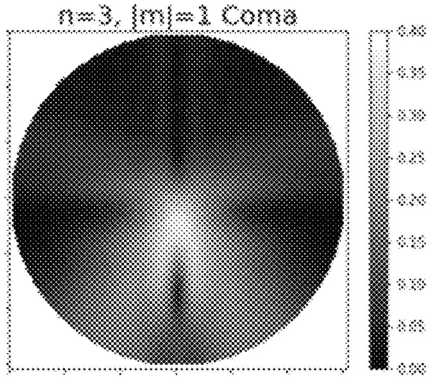
FIG. 4C is a diagram showing a coma aberration distribution ($|m|=1$, $n=3$) of the lens 2.

FIG. 4C is a diagram showing a coma aberration distribution (|m|=1, n=3) of the lens 2.

Figure 4D:
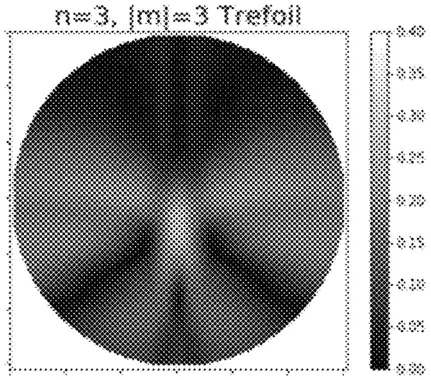
FIG. 4D is a diagram showing a Trefoil aberration distribution ($|m|=3$, $n=3$) of the lens 2.

FIG. 4D is a diagram showing a Trefoil aberration distribution (|m|=3, n=3) of the lens 2.

It should be noted that the dimensions are 50 mm×50 mm.

In the lens 2, Trefoil aberration is reduced and astigmatism is increased in an intermediate region on the main meridian of the lens 1. Aberration amounts of the lens 2 are as follows (unit is omitted).

m=2, n=2: astigmatism amount 0.06 m=1, n=1: coma aberration amount 0.38 m=3, n=3: Trefoil aberration amount 0.25

$$\begin{aligned} Li &= 2\times 0.06 + 1\times 0.38 + 3\times 0.25 \\ &= 125 \end{aligned}$$

Figure 5A:
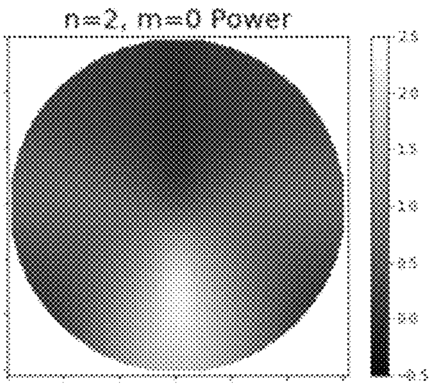
FIG. 5A is a diagram showing a refractive power distribution ($m=0$, $n=2$) of a lens 3.

FIG. 5A is a diagram showing a refractive power distribution (m=0, n=2) of a lens 3.

Figure 5B:
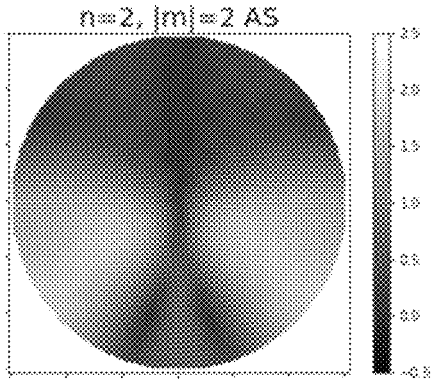
FIG. 5B is a diagram showing an astigmatism distribution ($|m|=2$, $n=2$) of the lens 3.

FIG. 5B is a diagram showing an astigmatism distribution (|m|=2, n=2) of the lens 3.

FIG. 5C is a diagram showing a coma aberration distribution (|m|=1, n=3) of the lens 3.

FIG. 5D is a diagram showing a Trefoil aberration distribution (|m|=3, n=3) of the lens 3.

It should be noted that the dimensions are 50 mm×50 mm.

In the lens 3, Trefoil aberration and astigmatism are increased in the intermediate region on the main meridian of the lens 1. Accordingly, astigmatism is reduced at points that are far from the main meridian. This means that even when a line of sight of the wearer passes through a peripheral portion of the spectacle lens, jitter or distortion of a recognized image is unlikely to occur.

Aberration amounts of the lens 3 are as follows (unit is omitted).

m=2, n=2: astigmatism amount 0.06 m=1, n=1: coma aberration amount 0.38 m=3, n=3: Trefoil aberration amount 0.39

$$\begin{aligned} Li &= 2\times 0.06 + 1\times 0.38 + 3\times 0.39 \\ &= 1.67 \end{aligned}$$

Ei of the wearer A is larger than the standard value Es. Accordingly, it is necessary to obtain a spectacle lens of which Li is low as a design solution for the wearer A. As a result, the lens 2 is selected for the wearer A.

Figure 6:
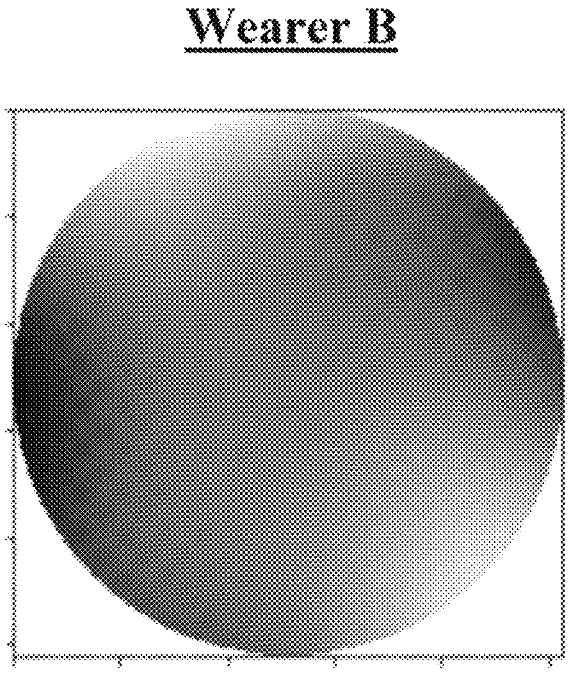
FIG. 6 is a diagram showing an aberration distribution of a portion of the cornea corresponding to the pupil of an eye of a wearer B around an optical axis.

FIG. 6 is a diagram showing an aberration distribution of a portion of the cornea corresponding to the pupil of an eye of a wearer B around the optical axis. It should be noted that the dimensions are 4 mm×4 mm.

Aberration amounts of the eye of the wearer B are as follows (unit is omitted).

m=2, n=2: astigmatism amount 0.75
m=1, n=3: coma aberration amount 0.10
m=3, n=3: Trefoil aberration amount 0.05
m=2, n=4: higher order astigmatism amount 0.03
m=4, n=4: Tetrafoil aberration amount 0.05

Ei of the wearer B is as follows.

$$\begin{aligned} Ei &= 1\times 0.10+3\times 0.05+2\times 0.03+4\times 0.05 \\ &= 0.51 \end{aligned}$$

Ei of the wearer B is smaller than the standard value Es. Accordingly, it is necessary to obtain a spectacle lens of which Li is high as a design solution for the wearer B. As a result, the lens 3 is selected for the wearer B.

In this example, basic designs of the lenses 1 to 3 are prepared, but it is also possible to select a spectacle lens of which Li is relatively low, from among an existing lineup of spectacle lenses.

The technical scope of the present invention is not limited to the above embodiment, and also includes configurations in which various changes or modifications are made within a scope in which particular effects achieved by constitutional elements of the present invention or a combination of the constitutional elements can be achieved.

In the example described above, Ei is defined using only aberration amounts, but another parameter may be added, or Ei may be determined using another parameter instead of aberration amounts, rather than adding the other parameter. The parameter is, for example, at least one of a degree of turning of the eye of the wearer, a degree of a change in the pupil diameter of the wearer, the age of the wearer, an environment in which the wearer uses spectacles or an intended use of the spectacles for the wearer, and a time elapsed from the last visit of the wearer to an optician's store.

If the degree of turning of the eye of the wearer and/or the degree of a change in the pupil diameter of the wearer are/is small, a change in the amount of aberration is small when aberration in the eye and aberration in the spectacle lens are combined, and therefore, the value of Ei may be reduced according to the degree of turning of the eye.

When the age of the wearer is high, it is highly likely that rotational asymmetry of a wavefront in the eye is strong, and accordingly, the value of Ei may be increased according to the age of the wearer.

When the time (period of time) elapsed from the last visit of the wearer to an optician's store is long, it is highly likely that rotational asymmetry of a wavefront in the eye is strong, and accordingly, the value of Ei may be increased according to the time.

Furthermore, it is also possible to define Ei based on at least one of the age of the wearer and the time elapsed from the last visit of the wearer to an optician's store, rather than defining Ei using aberration amounts. This is because the strength of rotational asymmetry of an aberration distribution of the eye of the wearer about the optical axis can be estimated based on these two parameters.

In addition to or in place of Ei, Es may also be defined based on at least one of: a standard or average aberration that is obtained statistically or academically with respect to an eye of a spectacle wearer; a degree of turning of the eye of the wearer; a degree of a change in the pupil diameter of the wearer; the age of the wearer; an environment in which the wearer uses spectacles or an intended use of the spectacles for the wearer; and a time elapsed from the last visit of the wearer to an optician's store. For example, when the age of the wearer is high, it is highly likely that Ei is high. In this case, instead of correcting the value of Ei, it is also possible to reduce the threshold value, i.e., Es, which serves as a bar, to make it easy to satisfy Ei>Es and consequently make a lens having a low value of Li more likely to be selected.

A progressive refractive power lens including the far-vision region, the near-vision region, and the intermediate region is described as an example of the spectacle lens. An aspect of the present invention may be applied to a progressive refractive power lens (WO2020/067522, WO2020/067523) in which transmission astigmatism is added to the intermediate region and the near-vision region, rather than the far-vision region, among such progressive refractive power lenses. The aspect of the present invention may be adopted to determine the degree of transmission astigmatism to be added. The entire contents of both documents can be incorporated in the present specification.

Method for Manufacturing Spectacle Lens

The present invention can also be applied to a method for manufacturing a spectacle lens. Specifically, a spectacle lens can be designed in accordance with the method for designing a spectacle lens described above, and the spectacle lens can be manufactured using a known method. Note that a "method for supplying a spectacle lens" may be used as an expression that means at least one of the design method and the manufacturing method described above. Similarly, the following system may also be called a "system for supplying a spectacle lens".

System for Designing Spectacle Lens

The following describes a system for designing a spectacle lens according to an aspect of the present invention. Descriptions of matter that overlaps the matter described in "Method for designing spectacle lens" are omitted.

A system for designing a spectacle lens, including:

a design unit configured to:

obtain, as a design solution, a spectacle lens that has an aberration distribution of which rotational asymmetry is weak in a region having a predetermined width and a center at any point on a main meridian of the spectacle lens, when rotational asymmetry of an aberration distribution of an eye of a wearer about an optical axis is strong; and obtain, as a design solution, a spectacle lens of which rotational asymmetry is strong in the region, when rotational asymmetry of the aberration distribution of the eye of the wearer about the optical axis is weak.

The system for designing a spectacle lens according to the aspect of the present invention is only required to include the design unit. The design unit may be installed in a computer that executes a predetermined program as necessary.

The system for designing a spectacle lens according to the aspect of the present invention preferably includes the following units in addition to the design unit.

A calculation unit that calculates Ei, Li, and the like.

A storage unit that stores a plurality of design solutions having different values of Li (including Li values, other examples include basic designs, design data, etc.), Ei of the wearer, the standard value Es, and the like.

An eyeball measurement device for determining Ei.

A spectacle lens measurement device for determining Li.

A determination unit that determines which of Ei>Es and Ei≤Es applies.

Figure 7:
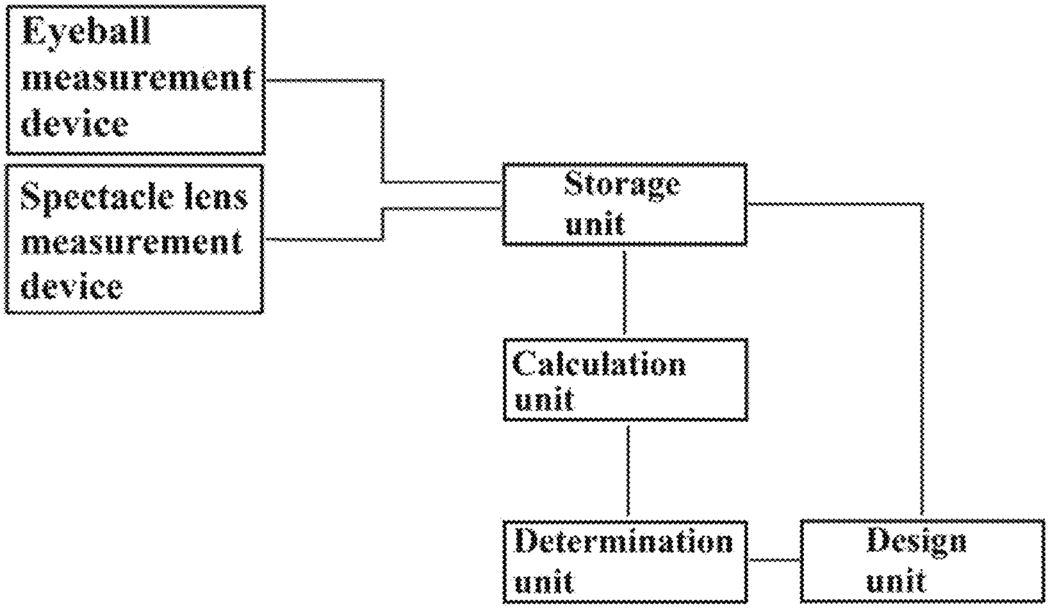
FIG. 7 is a block diagram showing a configuration of a system for designing a spectacle lens according to an aspect of the present invention.

FIG. 7 is a block diagram showing a configuration of the system for designing a spectacle lens according to an aspect of the present invention.

The calculation unit has a function of performing calculations of the above Expressions 1 to 4. The function of the calculation unit can be realized by a unit that executes a predetermined program as necessary in the computer.

The storage unit may store at least any of a standard or average aberration that is obtained statistically or academically with respect to an eye of a spectacle wearer; a degree of turning of the eye of the wearer; a degree of a change in the pupil diameter of the wearer; the age of the wearer; an environment in which the wearer uses spectacles or an intended use of the spectacles for the wearer; and a time elapsed from the last visit of the wearer to an optician's store, in addition to the plurality of design solutions of lenses, Ei, and Es. The storage unit may be an HDD or the like installed in the computer.

There is no limitation on the eyeball measurement device so long as information for determining Ei can be collected. Also, there is no limitation on the spectacle lens measurement device so long as information for determining Li can be collected. For example, it is possible to use FUJINON F601, which is a compact laser interferometer manufactured by FUJIFILM Corporation and in which a Fizeau interferometric method is used, to obtain wavefront data and an aberration distribution.

The calculation unit, the storage unit, the eyeball measurement device, and/or the spectacle lens measurement device do not always have to be installed in the system. For example, the system may be connected to any of these units provided in a network outside the system.

The following describes steps performed using the system.

Figure 8:
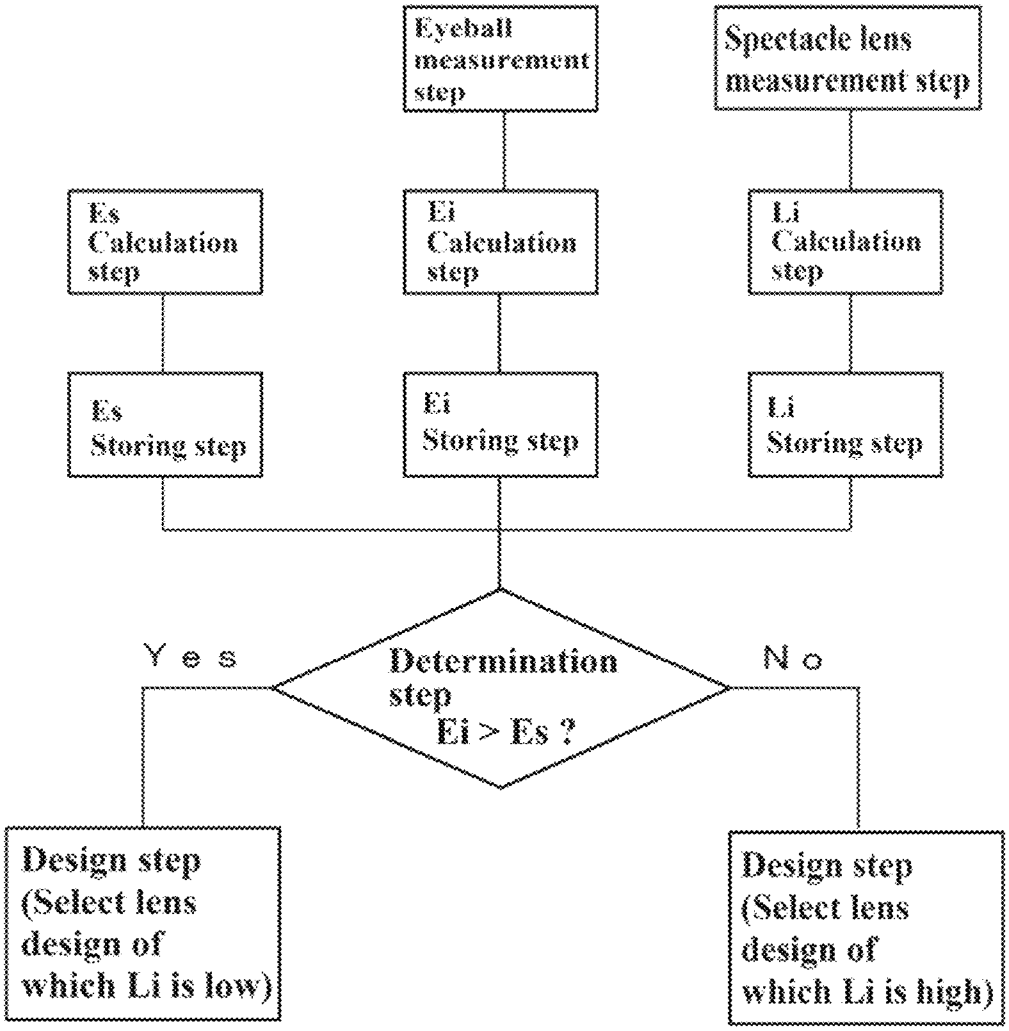
FIG. 8 is a flowchart of the system for designing a spectacle lens according to an aspect of the present invention.

FIG. 8 is a flowchart of the system for designing a spectacle lens according to an aspect of the present invention.

First, an aberration amount is measured using the eyeball measurement device with respect to each set of m and n in a polar coordinate expression of a Zernike aberration coefficient of the subject (who is to be a wearer) (eyeball measurement step). Based on the result of measurement, Ei is calculated by the calculation unit (Ei calculation step). Ei is stored in the storage unit (Ei storing step).

In an aspect of the present invention, Lit to Lin of lens design solutions 1 to n (n is an integer of at least 2) that are prepared in advance are obtained (Li preparation step). Lit to Lin are stored in the storage unit.

Instead of performing the Li preparation step, it is also possible to prepare a plurality of lens design solutions, and measure an aberration amount with respect to each set of m and n in a polar coordinate expression of a Zernike aberration coefficient of each spectacle lens using the spectacle lens measurement device (spectacle lens measurement step). For the sake of convenience of description, the expression "spectacle lens measurement step" is also used for lens design solutions that are prepared before spectacle lenses are actually manufactured. Of course, it is also possible to actually prepare spectacle lenses and measure an aberration amount with respect to each set of m and n in a polar coordinate expression of a Zernike aberration coefficient of each spectacle lens using the spectacle lens measurement device. Based on the result of the spectacle lens measurement step, Li is calculated by the calculation unit (Li calculation step). Li is stored in the storage unit (Li storing step).

A standard value Es is calculated by the calculation unit using data of wearers stored in the storage unit (Es calculation step). Es is stored in the storage unit (Es storing step).

Then, the determination unit determines which of Ei>Es and Ei≤Es applies. When Ei>Es applies, the design unit selects a design solution of a lens that has a low value of Li among Lit to Lin (design step). At this time, the design solution may be selected from among Li1 to Lin of the plurality of lens design solutions, according to a difference between Ei and Es. For example, when Ei>Es applies and the difference between Ei and Es is extremely large, a design solution of which Li is the lowest among Lit to Lin may be selected.

A configuration is also possible in which a standard value Ls is calculated by the calculation unit using the method described as a variation of the aspect of the present invention (Ls calculation step). Ls may be stored in the storage unit (Ls storing step). Then, whether Li is higher or lower than the standard value Ls may be evaluated and Li of a predetermined value may be selected in the design step.

What is claimed is:

1. A method for manufacturing a spectacle lens, wherein
an index that is obtained by quantifying rotational asymmetry regarding the aberration distribution of an eye of a wearer about an optical axis is represented by Ei,
a standard value of Ei is represented by Es, and
an index that is obtained by quantifying rotational asymmetry of an aberration distribution in a region (i) having a predetermined width and (ii) a center at any point on a main meridian of a spectacle lens is represented by Li,
the method comprising:
performing, by a computer,
obtaining, as a design solution, a spectacle lens of which Li is a first amount when Ei is larger than Es, and
obtaining, as a design solution, a spectacle lens of which Li is a second amount when Ei is not larger than Es, the first amount being lower than the second amount; and
manufacturing a spectacle lens having an aberration distribution of which rotational asymmetry is the first amount or the second amount.

2. The method for manufacturing a spectacle lens according to claim 1,
wherein obtaining the spectacle lens as a design solution includes selecting a design solution from a plurality of design solutions that have different values of Li.

3. The method for manufacturing a spectacle lens according to claim 1,
wherein the rotational asymmetry of the aberration distribution of the eye is of a portion of a cornea corresponding to a pupil of the eye of the wearer, about the optical axis.

4. The method for manufacturing a spectacle lens according to claim 3,
wherein Ei is expressed by the following Expression 1, and $$\sum_{m,n} mE_{m,n} \quad \text{Expression 1}$$

Li is expressed by the following Expression 2, $$\sum_{m,n} mL_{m,n} \quad \text{Expression 2}$$

wherein E and L respectively represent polar coordinate expressions of Zernike aberration coefficients of the eye of the wearer and the spectacle lens, m represents a value indicating an order in a circumferential direction, and n represents a value indicating an order in a radial direction.

5. The method manufacturing a spectacle lens according to claim 1, wherein Ei is determined based on at least one of a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

6. The method for manufacturing a spectacle lens according to claim 1, wherein Es is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

7. The method for manufacturing a spectacle lens according to claim 1, wherein a spectacle lens is obtained as a design solution according to a difference between Ei and Es.

8. The method for manufacturing a spectacle lens according to claim 1, wherein the spectacle lens is a progressive refractive power lens.

9. A system for manufacturing a spectacle lens, wherein an index that is obtained by quantifying rotational asymmetry regarding the aberration distribution of an eye of a wearer about an optical axis is represented by Ei, a standard value of Ei is represented by Es, and an index that is obtained by quantifying rotational asymmetry of an aberration distribution in a region (i) having a predetermined width and (ii) a center at any point on a main meridian of a spectacle lens is represented by Li, the system comprising:

a computer configured to:

obtain, as a design solution, a spectacle lens of which Li is a first amount when Ei is larger than Es; and obtain, as a design solution, a spectacle lens of which Li is a second amount when Ei is not larger than Es, the first amount being lower than the second amount, wherein the system is configured to manufacture a spectacle lens having an aberration distribution of which rotational asymmetry is the first amount or the second amount.

10. The system for manufacturing a spectacle lens according to claim 9, wherein obtaining the spectacle lens as a design solution includes selecting a design solution from a plurality of design solutions that have different values of Li.

11. The system for manufacturing a spectacle lens according to claim 9, wherein the rotational asymmetry of the aberration distribution of the eye is of a portion of a cornea corresponding to a pupil of the eye of the wearer, about the optical axis.

12. The system for manufacturing a spectacle lens according to claim 11, wherein Ei is expressed by the following Expression 1, and $$\sum_{m,n} mE_{m,n} \quad \text{Expression 1}$$

Li is expressed by the following Expression 2, $$\sum_{m,n} mL_{m,n} \quad \text{Expression 2}$$

wherein E and L respectively represent polar coordinate expressions of Zernike aberration coefficients of the eye of the wearer and the spectacle lens, m represents a value indicating an order in a circumferential direction, and n represents a value indicating an order in a radial direction.

13. The system for manufacturing a spectacle lens according to claim 11, wherein Ei is determined based on at least one of a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

14. The system for manufacturing a spectacle lens according to claim 9, wherein Es is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

15. The system for manufacturing a spectacle lens according to claim 9, wherein a spectacle lens is obtained as a design solution according to a difference between Ei and Es.

16. The system for manufacturing a spectacle lens according to claim 9, wherein the spectacle lens is a progressive refractive power lens.

* * * * *